Dec. 12, 1933.   H. JUNKERS   1,939,173
VIBRATION DAMPER
Filed Dec. 12, 1929   3 Sheets-Sheet 2
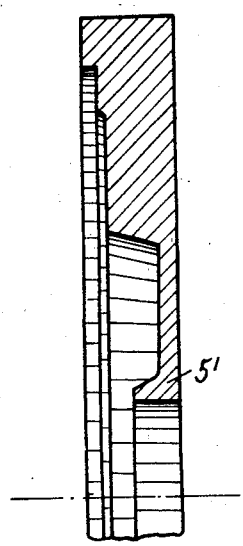
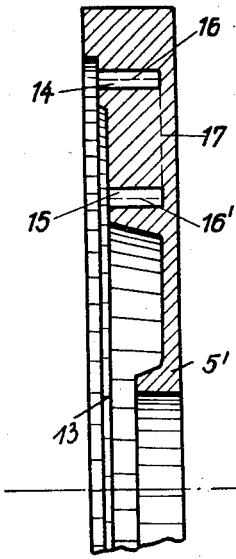
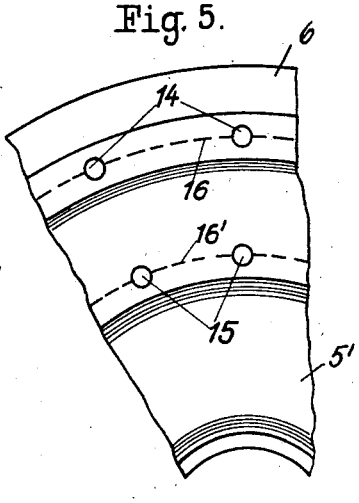
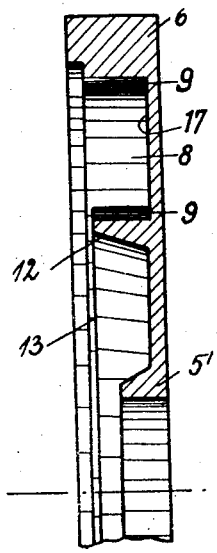
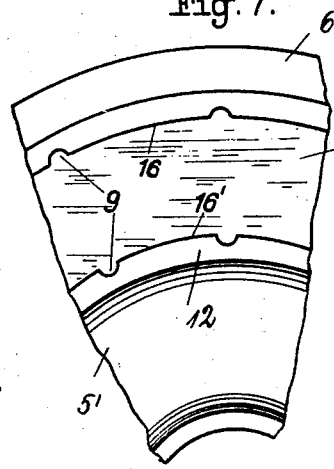
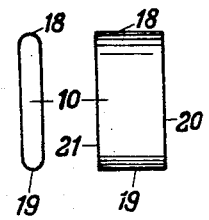
Inventor:
Hugo Junkers Inventor:
Hugo Junkers
by Kindhalter
Atty.

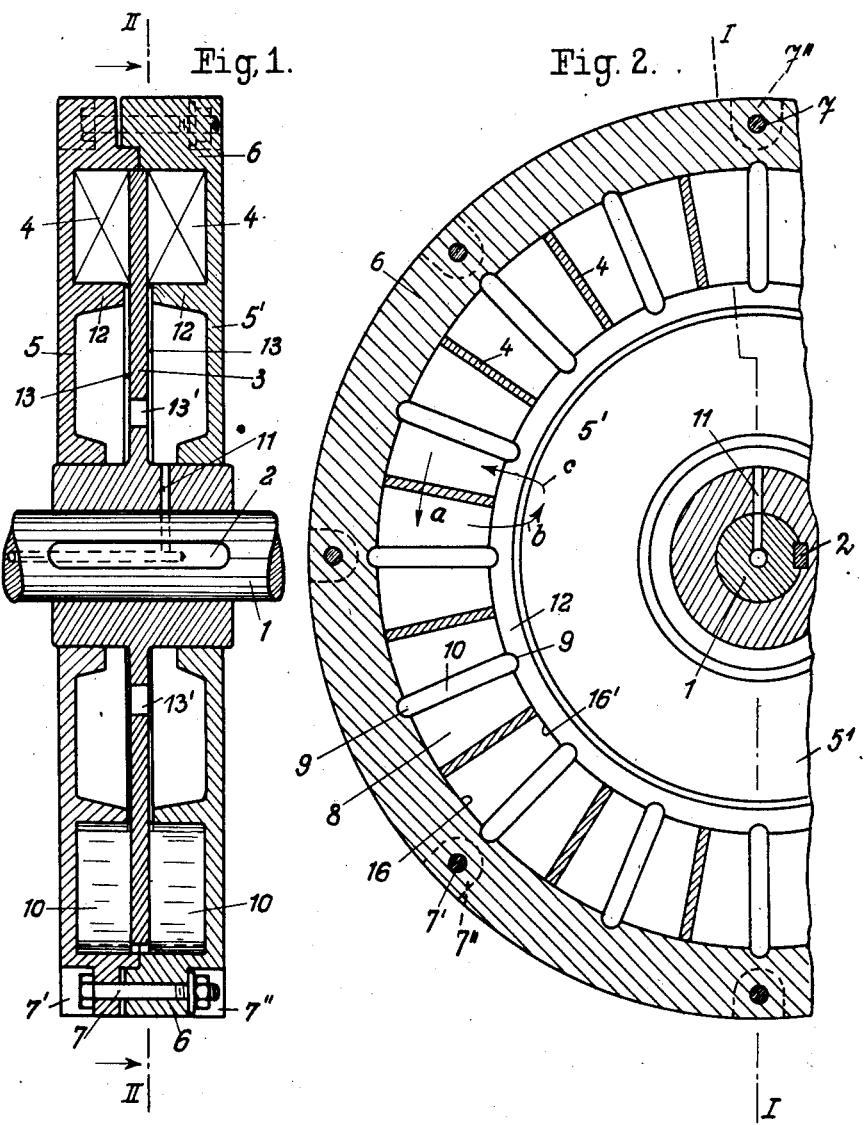

Patented Dec. 12, 1933

1,939,173

UNITED STATES PATENT OFFICE 1,939,173

VIBRATION DAMPER

Hugo Junkers, Dessau, Germany

Application December 12, 1929, Serial No. 413,606, and in Germany December 18, 1928

10 Claims. (Cl. 74—6)

My invention relates to vibration dampers, i. e., means for damping the relative circumferential displacement of rotary elements, for instance shafts subjected to the alternating forces exerted in a reciprocating engine, and which support rotary elements, such as fly-wheels, propellers, and the like. It has reference also to the method of producing such damping means.

It has already been suggested to combine with a shaft of the kind above described a damping device having the form of an inertia mass which is free to rotate with respect to the shaft and is connected with the shaft by friction means, so that it partakes in the rotation of the shaft, but is influenced only to a limited extent by variations in the rotation of the shaft so that it will rotate more uniformly than the shaft and will alternately lead and lag with respect to the shaft. This relative circumferential displacement of the shaft and the inertia mass consumes a certain amount of energy which would otherwise increase the irregularities in the rotation of the shaft.

Instead of friction means, hydraulic means may be used to consume the energy by expelling the liquid through passages of high resistance. A device of this type comprises two interengaging parts corresponding to a cylinder and a piston, one of them being positively connected with the shaft, while the other part is free to rotate about the shaft with the inertia mass. The part corresponding to the piston fits with some clearance in the part corresponding to the cylinder, which is filled with a liquid and is closed on all sides. Whenever relative displacement of the two parts occurs, fluid is expelled from the space on one side of the piston part and passes to the space on the other side.

In a device of this type the piston parts may be vanes which are secured to the shaft and are displaced with respect to circular chambers in the inertia mass, or vice versa.

Devices of this kind as heretofore designed involve serious drawbacks. The stresses resulting from centrifugal forces and from the pressure of the liquid are high, particularly at high velocity and thereore it is necessary as a rule to make both parts of high-class material, for instance steel. This is not desirable as parts of the same material do not work well together. Another drawback is that the machining of the chambers is difficult and expensive in view of the high degree of accuracy required.

It is an object of my invention to overcome these drawbacks. To this end I replace the separate chambers of the old device by a single annular recess, and I subdivide the recess by inserting partitions which may be made of any suitable material, for instance cast iron. The depth of the partitions is preferably so determined that their edges make a tight sliding fit on the element having the vanes. The vanes fit the chambers formed by the partitions and the recess with a slight clearance, so that they are not subjected to wear. On the other hand the partitions, the edges of which are subjected to wear, are readily exchangeable.

It is another object of my invention to facilitate the required exact fitting and the firm hold of the partitions in the chambers. To this end I form grooves in the walls of the annular recess for the reception of the vanes and make the partitions resilient, so as to fit the grooves with some pressure.

Various means may be provided for holding the partitions in their grooves as described. The partitions themselves may be resilient, or resiliency may be obtained by spring means combined with the partitions. Obviously in case of a partition, which is resilient in itself, not only good running properties but also resiliency are a consideration. A suitable material for partitions of this type is bronze.

It is still another object of my invention to provide a method of making devices of the kind described in such manner that chambers of exact size are obtained by simple and inexpensive expedients.

To this end I make a blank for the element in which chambers shall be formed by the above-mentioned partitions. This blank is machined with the exception of the part designed for the annular recess, which remains solid. The face of this solid part may be flat, tapering or cylindrical, or of any other suitable configuration. With cylindrical faces, the two parts are inserted one within the other and the vanes on one of the parts fit a peripheral circular recess in the other part. In the case of a flat face, two concentric circles, and in the case of a cylindrical face, two coaxial circles of equal radius, are drawn on the face about the axis of the blank, and along each circle holes are drilled, preferably at right angles to the face, to its generatrix or to its tangent, these holes being pitched in conformity with the pitch of the vanes. The distance of the two concentric circles in a flat or tapering face is substantially equal to the radial width of the recess for the chamber. The pitch of two adjacent holes, on their respective circles, corresponds to the lengths of the chambers in the recess measured on the inner and the outer walls of the recess, and a pair of opposite holes on the same radius of the two circles defines the position of each partition. The holes are drilled exactly to the depth of the finished recess. The recess is now machined in the solid block along the two circles, leaving a set of grooves instead of circular holes in the inner and outer walls of the recess. These grooves receive the partitions which are rounded at their ends.

In the drawings affixed to this specification and forming part thereof a damping device embodying my invention together with various types of partitions and the several stages of machining the annular recess from a blank are illustrated diagrammatically by way of example.

In the drawings

Fig. 1 is an axial section of a damping device on the line I—I in Fig. 2, and

Fig. 2 is a section on the line II—II in Fig. 1,

Figure 10:
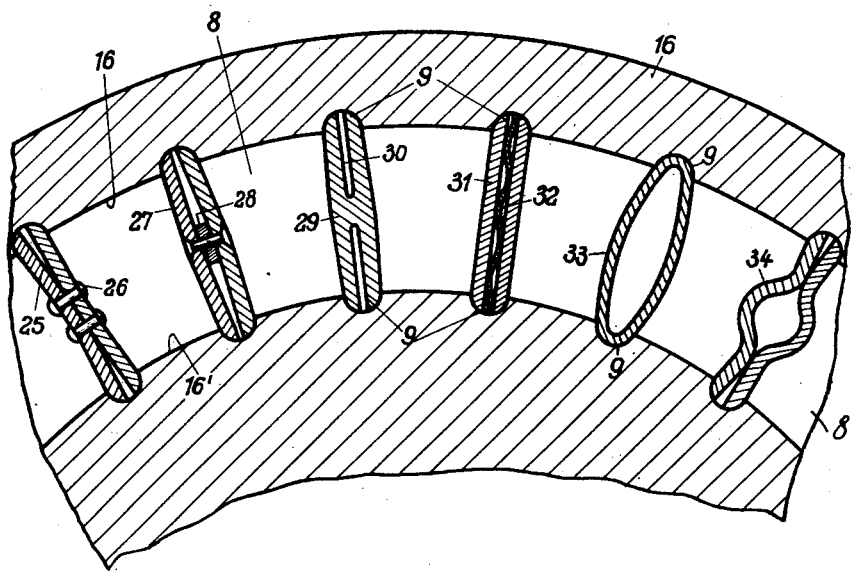
Figures 11, 12, 13, 14, 15, 16:
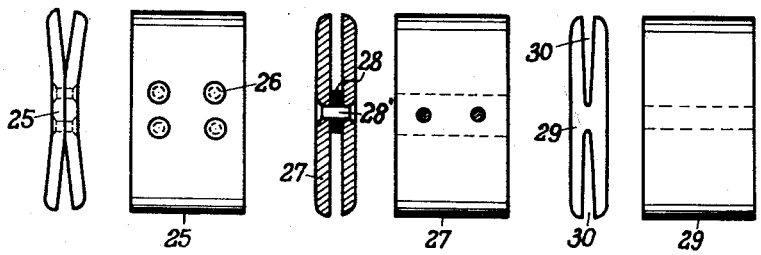

Fig. 3 is an axial section showing part of the blank ready for the machining of the annular recess, Figs. 4 and 5 are a section and an end elevation, respectively, of the blank after the holes have been drilled for the grooves in which the partitions are fitted, Figs. 6 and 7 are a section and an end elevation, respectively, of a finished blank, Fig. 8 is an end elevation, and Fig. 9 is an elevation of a non-resilient partition, Fig. 10 is a section of an annular chamber showing various types of partitions which engage the grooves in the walls of the recess under resilient pressure, Fig. 11 is an end elevation, Fig. 12 is a side elevation of the partition at the left in Fig. 10, and Figs. 13–16 are similar views illustrating the second and the third partition from the left in Fig. 10, respectively.

Referring to the drawings and first to Figs. 1 and 2, 1 is a shaft on which is secured by means of a key 2 the boss of one of the elements 3, which will be referred to hereinafter as the "vane element" and 4, 4 are radial vanes projecting from opposite sides of the element 3 and near its edge. The vane element is surrounded by a part which will be referred to hereinafter as the "chamber element" and which consists of two parts 5 and 5' which are connected by screws 7. The screws are inserted in holes extending through the rims 6 of the two parts 5, 5'. Recesses 7' and 7" are formed in the parts for the reception of the head and the nut of the screws. The chamber element 5, 5' is fitted to rotate on the boss of the vane element 3, but might as well be seated on the shaft near the ends of the boss, and its comparatively heavy rim 6 constitutes the inertia mass. 8 is the annular recess referred to, which is shown in the part 5', it being understood that an exactly similar recess is formed in the part 5. The partitions 4, 4 project into the chambers of the respective parts with a slight clearance. 10 are partitions inserted in grooves 9, 9 in the walls 16 and 16' of the recess 8 with their inner and outer ends. A partition of the simplest type, which is not capable of exerting resilient reaction on the grooves 9, is illustrated in Figs. 8 and 9. The inner and outer edges 18 and 19 are rounded in conformity with the radius of the grooves 9. The edges of the partition are indicated at 20 and 21 in Fig. 9. One of the edges fits tightly the bottom of the recess 8 in the part 5 or 5', while the other edge makes a tight sliding fit of the vane element 3.

It will appear from Fig. 2, that in this manner the annular recesses 8 are subdivided into a circular row of chambers, each chamber being bordered by two partitions, with one of the vanes 4 between them. The open inner sides of the chambers face the vane element 3 and are covered by it.

A liquid such as for instance oil is supplied to the cavities enclosed by the parts 5, 5' and 3 through a passage 11 in the shaft 1 and in the boss of the vane element 3. The inner ring 12, which borders the annular recess 8, is set back with respect to the vane element 3 at 13, and holes 13' are formed in the vane element so that the liquid has free access to the recess 8.

Supposing that the apparatus rotates at uniform velocity and that, due to the irregularity to which the rotation of the shaft 1 is subjected, being actuated, for instance, by a reciprocating engine, the shaft leads with respect to the chamber element 5, 5' in the direction of the arrow $a$, Fig. 2, liquid is expelled in all chambers from that space of the chambers, which is in front of the vane 4, and is drawn into the space at the rear of the vane, as indicated by the arrows $b$ and $c$ in Fig. 2. When the shaft 1 lags, the vanes 4 moving in a direction opposite to that indicated by the arrow $a$ with respect to the chambers, the liquid is expelled and the loss made up for in the opposite direction.

By expelling the liquid from one chamber into the other through the narrow clearances between the vanes and the walls of the chamber, and partly through the clearances 13, power is absorbed and the velocity and the angle at which the shaft 1 is displaced with respect to the inertia mass 6 of the chamber element 5, 5' are reduced.

Referring now to Figs. 10–16, various types of resilient partitions are shown which may replace the rigid partitions 10 shown in Figs. 8 and 9. Rigid partitions obviously require exact fitting of their inner and outer ends 18 and 19 in the grooves 9. This necessity is eliminated by the partitions illustrated in Figs. 10–16 which fit in the grooves by resilient reaction.

Referring first to Figs. 10, 11 and 12, 25 is a partition which is built up from two plates assembled at the centre and connected by rivets 26 or the like. The ends of the partitions are spread apart, as can be seen in Fig. 11, so that, when the partition is inserted, its ends engage the grooves 9 by resilient reaction.

Referring to Figs. 13 and 14, this partition, the second one from the left in Fig. 10, comprises two parallel resilient plates 27, with a distance plate 28 inserted between them. The parts are connected by rivets 28'. As will appear from Fig. 10, the partition is compressed at the ends for insertion in the grooves 9.

Referring now to Figs. 15 and 16, the partition 29, the third one from the left in Fig. 10, is designed on similar lines as the partition 27, but is made in one piece with slots 30 at either side of a solid web which corresponds to the distance plate in the partition referred to.

The fourth partition 31 from the left in Fig. 10 comprises two plates with a corrugated spring 32 inserted between them, which tends to force the plates apart so as to hold them in contact with the grooves 9.

The fifth partition from the left in Fig. 10 is a tube 33 of elliptical cross section, which, when inserted in the groove, slightly yields in the direction of the longitudinal axis of its section. Such a partition may also consist of two separate parts, which are obtained by dividing the tube 33 in its central plane.

The last partition 34 is a combination of the tube 33 with the spread ends of the partitions 25, 27, and 29. The tubular central part of this partition enables it to yield in the radial direction of the recess 8, that is, longitudinally, while the action of the spread ends is the same as described with reference to partition 25.

Referring to Figs. 3–7, 3 is a blank which has been machined to size, but is still lacking the annular recess 8. As shown in Figs. 4 and 5, concentric circles 16 and 16' are drawn on the face of the blank, the circle 16 defining the outer and the circle 16' the inner wall of the recess 8 as shown in Fig. 2. Holes 14 and 15 are drilled along the circles 16 and 16', respectively, and pitched in conformity with the size of the chambers. In the present instance the face of the block for the annular recess is flat and extends at right angles to the axis of the part 5', and the holes 14, 15 extend in parallel relation with the axis of the shaft 1. The axis of each hole coincides with the corresponding circle 16 or 16', as the case may be, and each two opposite holes are arranged on the same radius. The diameter of the holes is equal to the thickness of the partitions 10 and their depth is equal to the depth of the annular recess.

When the holes 14 and 15 have been drilled, the material of the block is removed between the circles 16 and 16' to the depth of the holes, as indicated by the line 17 in Figs. 4 and 6. The blank now has the annular recess 8, as shown in Figs. 6 and 7. The inner half of each hole 14, 15 has been removed and only a row of semi-cylindrical grooves 9 is left, in which the partitions 10, or partitions of the types illustrated in Figs. 10–16, are inserted. As mentioned above, with non-resilient partitions the inner and outer edges 18 and 19 require exact fitting to the grooves 9 which is not required with the resilient partitions.

The depth of the partitions must be determined exactly so that one edge of a partition, for instance the edge 20, fits tightly the bottom 17 of the annular recess in the part 5', and the opposite edge 21 just engages the vane part 3 at a tight sliding fit. When the partitions have been inserted, the device with the chambers formed in the annular recess 8 by the partitions and the vanes 4 between the partitions is completed as shown in Fig. 2.

The face of the block, in which the annular recess 8 is machined, has been shown and described as being flat and extending at right angles to the axis of the shaft 1. As mentioned above, the face may be tapering or cylindrical or of any other configuration. Obviously the portion of the vane element 3 from which the vanes 4 project and the edges of the partitions which slide on the vane element, must be shaped in conformity with the faces of the chamber elements 5 and 5'. The holes 14, 15 for the grooves 9 are preferably arranged at right angles to the generatric of, or the tangent to, the face While I have shown the vane element 3 as being connected with the shaft 1, and the chamber element 5, 5' as being connected with the inertia mass 6, it is to be understood that the elements may be exchanged, that is, the vane element might be connected with the inertia mass and the chamber element with the shaft.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves, and vanes on the other of said elements intermediate said partitions.

2. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves, vanes on the other of said elements intermediate said partitions, faces at opposite ends of said partition adapted to make, respectively, a tight fit with the bottom of said annular recess, and a tight sliding fit with the element having said vanes.

3. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition having resilient means in each pair of said grooves, and vanes on the other of said elements intermediate said partitions.

4. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition having slotted portions in each pair of said grooves, and vanes on the other of said elements intermediate said partitions.

5. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves, said partition comprising a pair of rigid parts having resilient means therebetween, and vanes on the other of said elements intermediate said partitions.

6. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves which is resilient in radial direction, related to said shaft, and vanes on the other of said elements intermediate said partitions.

7. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a tubular partition of elliptical cross-section in each pair of said grooves, and vanes on the other of said elements intermediate said partitions.

8. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves, said partition comprising two halves making up together a tube of elliptical cross-section with the ends of said parts engaging said grooves, and vanes on the other of said elements intermediate said partions.

9 In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves, said partition comprising a central portion which is resilient in radial direction, related to said shaft, and resilient means for engaging in said grooves, and vanes on the other of said elements intermediate said partitions.

10. In a vibration damper comprising a shaft, an element secured on said shaft, an element constituting an inertia mass rotatably mounted relative to said first-mentioned member, one of said elements having an annular recess provided with a plurality of pairs of grooves in the walls thereof, a partition in each pair of said grooves, said partition comprising two symmetrical halves, each half having a central portion which is resilient in radial direction related to said shaft, and resilient means for engaging in said grooves; and vanes on the other of said elements intermediate said partitions.

HUGO JUNKERS.